(12) United States Patent
Hamada et al.

(10) Patent No.: US 6,603,816 B1
(45) Date of Patent: Aug. 5, 2003

(54) RECEIVER AND RECEIVING-DECODING METHOD

(75) Inventors: Ichiro Hamada, Kanagawa (JP); Kenichi Suzuki, Tokyo (JP); Toshio Kato, Aichi (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/427,918

(22) Filed: Oct. 27, 1999

(30) Foreign Application Priority Data

Oct. 30, 1998 (JP) .......................................... 10-311177

(51) Int. Cl.⁷ ............................................... H04B 1/66
(52) U.S. Cl. ................... 375/240.27; 348/725
(58) Field of Search ................... 348/725, 726; 375/240.25, 240.27, 240.28

(56) References Cited

U.S. PATENT DOCUMENTS 5,920,572 A * 7/1999 Washington et al. ........ 348/476
6,034,732 A * 3/2000 Hirota et al. ................ 348/441
6,101,195 A * 8/2000 Lyons et al. ................. 348/512
6,363,061 B1 * 3/2002 Yuzawa ....................... 370/345

* cited by examiner

*Primary Examiner*—Chris Kelley
*Assistant Examiner*—George A Bugg
(74) *Attorney, Agent, or Firm*—Lerner, David, Littenberg, Krumholz & Mentlik, LLP

(57) ABSTRACT

A receiver having a simple configuration for receiving and decoding digital broadcasts and outputting decoded data to an external device and moreover, decoding externally-input data and outputting decoded data to an external device. There are included a received-data demodulating device for receiving and demodulating digital broadcasts and generating a first clock in accordance with the digital broadcast and a clock generating device for generating a third clock by frequency-dividing a predetermined second clock. The first clock is used when the digital broadcast is received and decoded and the third clock is used when externally-inputted data is decoded.

12 Claims, 3 Drawing Sheets

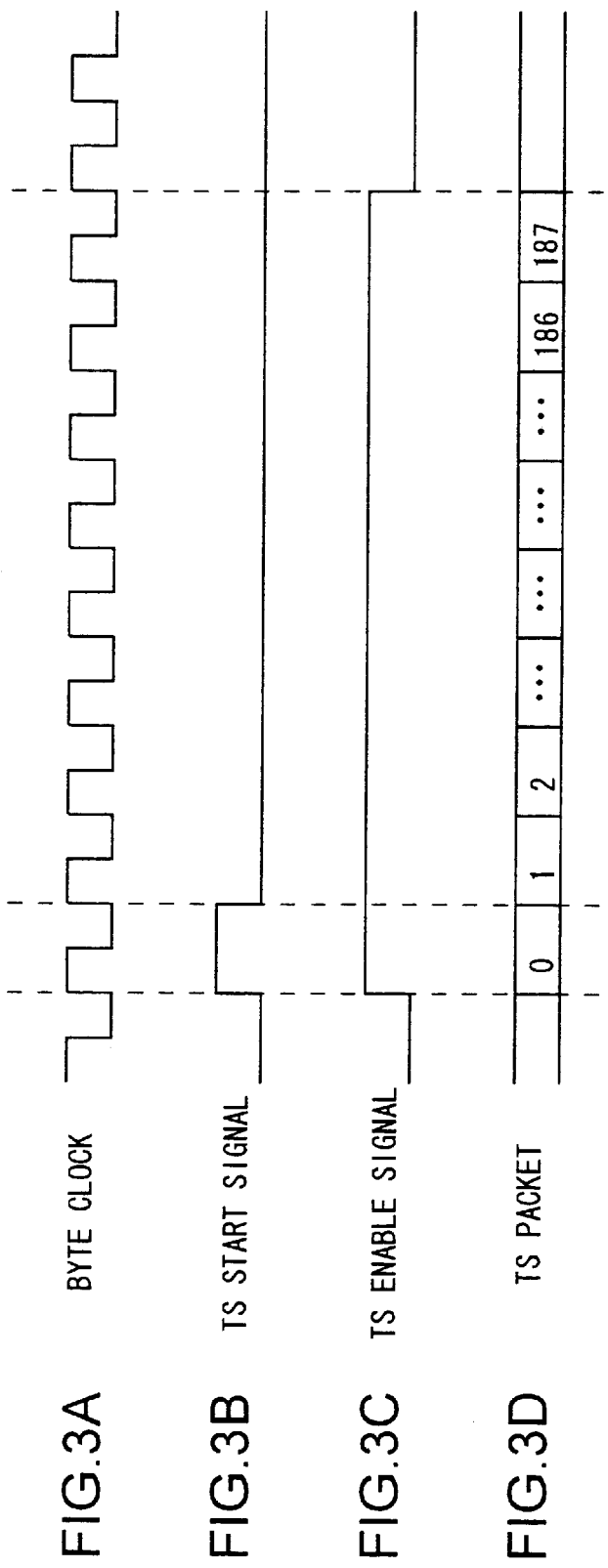

RECEIVER AND RECEIVING-DECODING METHOD

BACKGROUND OF THE INVENTION

1. Field of the Invention

This invention relates to a receiver and a receiving-decoding method, and more particularly, is suitably applied to a receiver for receiving, for example, digital television broadcasts and outputting an obtained transport stream to an external device and also inputting a transport stream from an external device and decoding it.

2. Description of the Related Art

Digital television broadcasting has already started whereby a video signal is digitalized in accordance with the compressing encoding method such as the moving picture experts group phase 2 (MPEG 2) method and broadcasts it on ground waves or satellite waves.

In such digital television broadcasting, the audience needs a digital-broadcast receiver-decoder referred to as an integrated receiver decoder (IRD) which receives and decodes the ground waves and satellite waves.

In FIG. 1, 1 denotes a digital-broadcast receiver-decoder as a whole and an antenna 5 receives broadcast radio waves S1 and supplies it to a front end 10. The front end 10 demodulates the broadcast radio waves S1, generates a transport stream S10 composed of successive transport stream (TS) packets, and outputs the stream S10 to a decipherer 12. The decipherer 12 deciphers each enciphered TS packet in the case when each TS packet is enciphered and supplies it to a divider 15.

The divider 15 extracts desired TS packets from the transport stream S10, divides them into audio TS packets and video TS packets and supplies them to a decoder 16. The decoder 16 decodes the audio TS packets S15A and the video TS packets S15V supplied from the divider 15 in accordance with the MPEG 2 method, and outputs them as an audio signal S16A and a video signal S16V to an external device.

In this case, the front end 10 generates a byte clock S11 synchronous with the transport stream S10 when the transport stream S10 is generated by demodulating the broadcast waves S1 and outputs the byte clock S11 to the decipherer 12 and the divider 15. The byte clock S11 is a sync signal for synchronizing and transferring data. The front end 10, decipherer 12, and divider 15 operate in accordance with the byte clock S11 and thereby transfer TS packets composing the transport stream S10 synchronously with the byte clock S11.

In this kind of digital-broadcast receiver-decoder, it is possible to use a high-speed digital data interface such as an institute of electrical and electronics engineers (IEEE) 1394, output and store a transport stream obtained by receiving broadcast radio waves into a digital recorder such as an externally-set digital video tape recorder (VTR) via the digital data interface, and also input and decode the transport stream stored in the digital recorder via the digital data interface.

However, when a transport stream is inputted via the digital data interface, it is possible that the byte clock of a digital-broadcast receiver decoder (that is, the byte clock of a transport stream obtained by receiving broadcast waves) would not coincide with the byte clock of a transport stream inputted via the digital data interface, that is, data transfer rates would not coincide with each other. Moreover, when the byte clock of the transport stream inputted via the digital data interface is faster than that of the digital-broadcast receiver-decoder, a problem occurs that some of the TS packets are not transferred from the digital-broadcast receiver-decoder, which could lead into a decoding trouble.

Furthermore, there can be a case in which digital broadcasts are not received when inputting a transport stream from the digital data interface. In which case, the front end 10 cannot generate a byte clock, which can be an obstacle to the operation of the digital-broadcast receiver-decoder.

SUMMARY OF THE INVENTION

In view of the foregoing, an object of this invention is to provide a receiver and a receiving-decoding method having a simple configuration to receive digital broadcasts, and output the obtained transport stream to an external device, and also to decode a transport stream inputted from the external device.

The foregoing object and other objects of the invention have been achieved by the provision of a receiver which comprises: a receiving part for receiving and demodulating the digital broadcasts to output the first transport stream; a digital interface for receiving the second transport stream supplied from an external device; and a decoding processor for decoding the first transport stream received in the receiving part or the second transport stream received in the digital interface. The decoding processor changes clocks for transferring a transport stream depending on which of the first and second transport streams is being decoded.

Further, the present invention provides a receiving-decoding method for receiving digital broadcasts comprising the steps of: receiving and demodulating the digital broadcasts in the receiving part so as to output a first transport stream; receiving a second transport stream supplied from an external device in a digital interface; transferring to a decoding processor and decoding the first transport stream received in the receiving part or the second transport stream received in the digital interface; and changing clocks used for transferring the transport stream depending on which of the first and second transport streams is being decoded.

Because a clock corresponding to the transfer rate of a transport stream to be decoded is selected, it is possible to decode all data strings without fail.

Moreover, because the third clock used to transfer the second transport stream is generated by frequency-dividing a second clock necessary for the operation of the digital interface, the configuration is simplified without separately using a clock generating circuit.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 3A to 3D are timing charts showing the transfer timing of TS packets.

DETAILED DESCRIPTION OF THE EMBODIMENT

Figure 1:
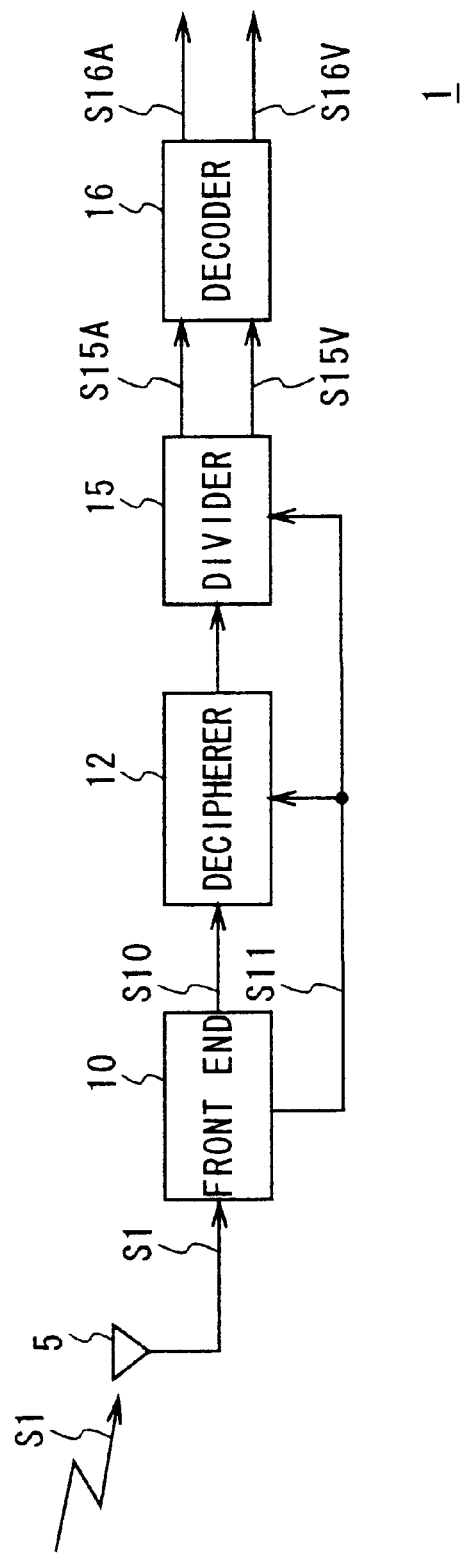
FIG. 1 is a block diagram showing the configuration of a digital-broadcast receiver-decoder.
Figure 2:
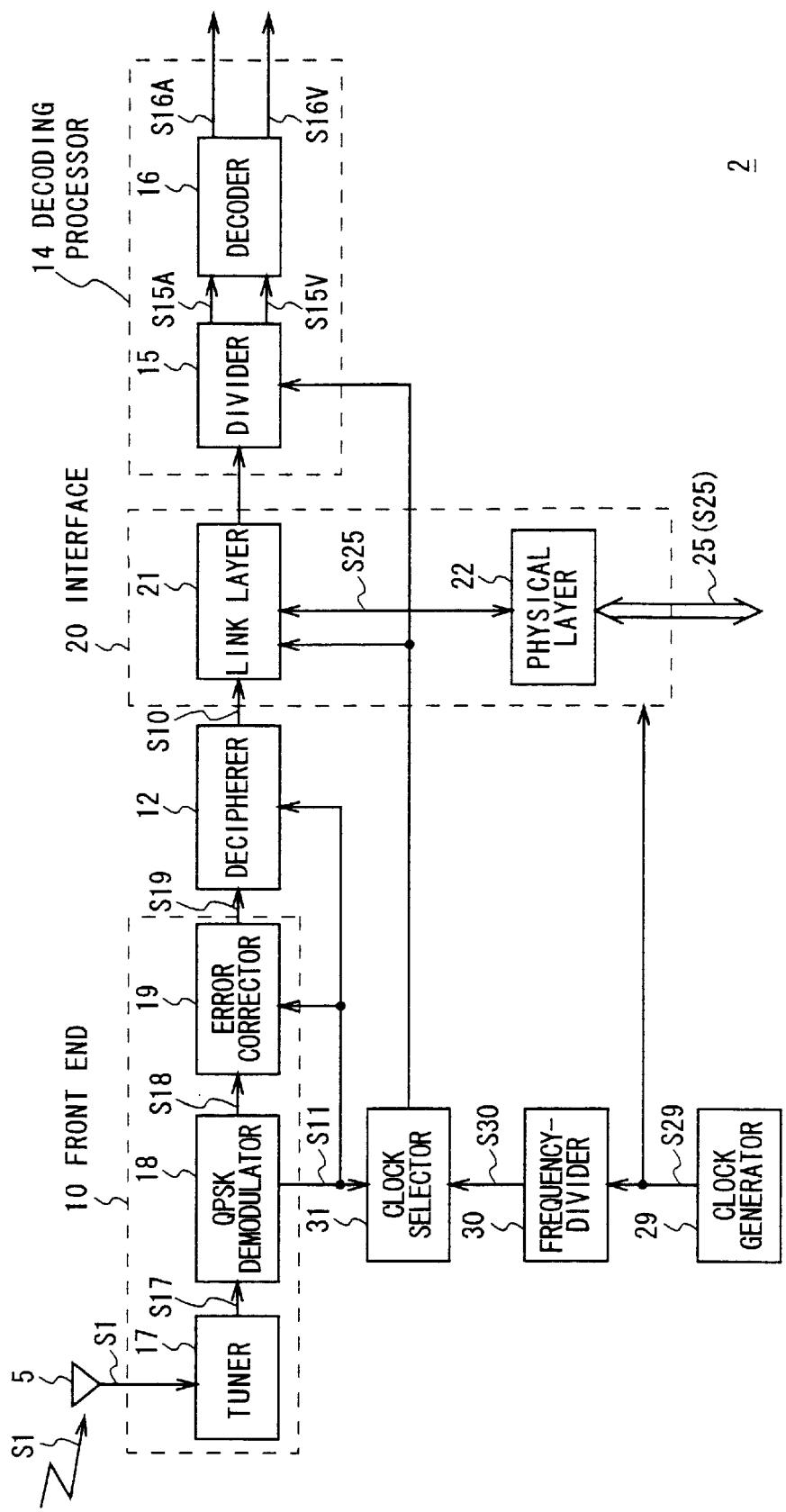
FIG. 2 is a block diagram showing the configuration of an embodiment of a digital-broadcast receiver decoder of the present invention.

Preferred embodiments of this invention will be described with reference to the accompanying drawings:

In FIG. 2 in which counterparts of FIG. 1 are provided with the same symbols, 2 denotes a digital-broadcast receiver-decoder as a whole, which operates in either broadcast receiving-decoding mode or external-input decoding mode in accordance with the control by a non-illustrated controller. The digital-broadcast receiver-decoder 2 receives broadcast radio waves S1 to demodulate a transport stream S10 in the broadcast receiving-decoding mode and then decodes the demodulated transport stream S10 into an audio signal S16A and a video signal S16V which are outputted to an external device. On the other hand, in the external-input decoding mode, the digital-broadcast receiver-decoder 2 decodes a transport stream S25 inputted through an institute of electrical and electronic engineers (IEEE) 1394 bus 25 into an audio signal S16A and a video signal S16V, which are outputted to an external device.

That is, in the broadcast receiving-decoding mode, the digital-broadcast receiver-decoder 2 receives the broadcast waves S1 via a receiving antenna 5 and supplies the broadcast waves S1 to a front end 10 serving as a received data demodulating means. The tuner 17 of the front end 10 selects and amplifies a targeted channel included in the broadcast radio waves S1 and supplies the amplified channel to a quadrature phase shift keying (QPSK) demodulator 18 as a received signal S17. The QPSK demodulator 18 demodulates the received signal S17 in accordance with the QPSK method, and supplies a demodulated signal S18 to an error corrector 19. And the QPSK demodulator 18 generates a byte clock S11 and supplies it to the error corrector 19, decipherer 12, and clock selector 31 serving as a clock selecting means.

The error corrector 19 applies predetermined error correction to the signal S18 from the QPSK demodulator 18 to output the signal S19 to the decipherer 12. The decipherer 12 deciphers the signal S19 supplied from the error corrector 19 in the case which it is enciphered, and outputs the transport stream S10 to an interface 20. In this case, the QPSK demodulator 18, error corrector 19, and decipherer 12 operate in accordance with the byte clock S11, which makes TS packets composing the transport stream S10 transferred synchronously with the byte clock S11.

The interface 20 serves as a digital data interface based on the IEEE1394 standard, which is composed of a physical layer 22 for exchanging data with other IEEE1394 interfaces (not illustrated) connected to the IEEE1394 bus 25 and a link layer 21 serving as data selecting means connected to the physical layer 22 to switch input and output of data. The link layer 21 has a buffer (not illustrated) for temporarily storing data.

The link layer 21 of the interface 20 directly supplies the TS packets of the transport stream S10 to the divider 15 of a decoding processor 14 and simultaneously outputs them to a digital recorder (such as a digital VTR) connected to the IEEE1394 bus 25 via the physical layer 22.

The divider 15 extracts desired TS packets from the transport stream S10 and divides them into audio TS packets S15A and video TS packets S15V which are supplied to the decoder 16. The decoder 16 decodes the audio TS packets S15A and the video TS packets S15V supplied from the divider 15 into an audio signal S16A and a video signal S16V in accordance with the MPEG2 method, which are outputted to an external device.

In this case, the clock selector 31 selects the byte clock S11 supplied from the QPSK demodulator 18 in the broadcast receiving-decoding mode and supplies it to the link layer 21 and divider 15. The decipherer 12, link layer 21, and divider 15 operate in accordance with the byte clock S11. This makes TS packets composing the transport stream S10 transferred synchronously with the byte clock S11.

Thus, the digital-broadcast receiver-decoder 2 receives the broadcast radio waves S1 and demodulates the transport stream S10 in the broadcast receiving-decoding mode and moreover, decodes the stream S10 into an audio signal S16A and a video signal S16V which are outputted to an external device. Also, when outputting the transport stream obtained from the received digital-broadcast via the interface to the external device, it is transferred from the decipherer 12 to the link layer 21 in accordance with the byte clock generated in the QPSK demodulator 18.

On the other hand, in the external-input decoding mode, the digital broadcast receiver-decoder 2 inputs the transport stream S25 supplied from a digital recorder (such as a digital VTR) connected to the IEEE1394 bus 25 to the interface 20. In this case, the transport stream S25 is supplied in the form of packets based on the IEEE1394 standard.

The physical layer 22 supplies the transport stream S25 inputted via the IEEE1394 bus 25 to the link layer 21. Then, the link layer 21 converts the transport stream S25 from packets of the IEEE1394 standard into TS packets and supplies them to the divider 15. The divider 15 divides the transport stream S25 into audio TS packets 15A and video TS packets 15V and supplies them to the decoder 16. The decoder 16 decodes the audio TS packets S15A and video TS packets S15V supplied from the divider 15 into an audio signal S16A and a video signal S16V in accordance with the MPEG2 method which are outputted to an external device.

Here, a system clock S29 is supplied to the interface 20 from a clock generator 29. The system clock S29 is a clock serving as the operation criterion of the whole interface 20. A frequency divider 30 frequency-divides the system clock S29 at a predetermined frequency-division rate and supplies it to the clock selector 31 as a byte clock S30. In the external-input decoding mode, the clock selector 31 selects the byte clock S30 supplied from the frequency divider 30 and supplies it to the link layer 21 and divider 15. Then, the link layer 21 and divider 15 operate in accordance with the byte clock S30. This makes TS packets composing the transport stream S25 transferred synchronously.

Thus, in the external-input decoding mode, the digital-broadcast receiver-decoder 2 decodes the transport stream S25 inputted via the IEEE1394 bus 25 into an audio signal S16A and a video signal S16V which are outputted to an external device.

FIGS. 3A to 3D show the relation between byte clock and TS-packet-transfer timing. FIG. 3A shows a byte clock for specifying the sync timing of each block for transmitting and receiving TS packets.

At the side of transmitting the TS packets, the TS start signal shown in FIG. 3B becomes logical "H" level during one clock when starting to transfer TS packages. At the same time, the TS enable signal shown in FIG. 3C becomes logical "H" level. The TS enable signal shows that a TS packet to be transferred is valid. At this timing, the TS packet shown in FIG. 3D is successively transferred synchronously with a byte clock.

The receiving side of the TS packets successively takes in TS packets synchronously with a byte clock while a TS enable signal has logical "H" level. Thus, TS packets are transferred between the transmitting side and the receiving side. When transfer of one packet (188 bytes) is completed, the TS enable signal becomes logical "L" level and transfer of one packet is completed.

In this connection, it is estimated that a byte clock of approximately 6 MHz is enough for a transport stream of a general digital television broadcast. Moreover, because the supply source of transport stream recorded in digital recorder such as a digital VTR would be a digital television broadcast, it could also be estimated that the byte clock of the transport stream S25 inputted via the IEEE1394 bus 25 is to be approximately 6 MHz.

Therefore, by setting the clock frequency of the byte clock S30 to 6 MHz or higher, it would be possible to prevent transfer fault of some transport streams S25. Because the system clock S29 of the IEEE1394 uses 50 MHz, it is possible to prevent transfer fault of some transport streams S25 by dividing the frequency of the system clock S29 by 8 to generate a clock of 6.25 MHz and using it as the byte clock S30.

In the above configuration, when broadcast radio waves are received and decoded, the digital-broadcast receiver-decoder 2 operates in the broadcast receiving-decoding mode.

That is, the digital-broadcast receiver-decoder 2 receives the broadcast radio waves S1 through the antenna 5, demodulates it by the front end 10 and deciphers ciphers in the decipherer 12 to generate the transport stream S10, and supplies it to the decoding processor 14 via the link layer 21. Then, the decoding processor 14 decodes the transport stream S10 into an audio signal S16A and a video signal S16V which are outputted to an external device.

In this case, the digital-broadcast receiver-decoder 2 operates in accordance with the byte clock S11 generated in the QPSK demodulator 18 and serving as a clock synchronizing with the transport stream S10, and synchronously transfers TS packets composing the transport stream S10.

On the other hand, when an externally-inputted transport stream is decoded, the digital-broadcast receiver-decoder 2 operates in the external-input decoding mode.

That is, the digital-broadcast receiver-decoder 2 inputs the transport stream S25 supplied from digital recorder connected to the IEEE1394 bus 25 to the interface 20 and to the decoding processor 14 via the link layer 21. Then, the decoding processor 14 decodes the transport stream S25 into an audio signal S16A and a video signal S16V which are outputted to an external device.

In this case, the digital-broadcast receiver-decoder 2 does not use a clock synchronous with the transport stream S25 but it generates a clock transferable at a rate faster than an assumed maximum transfer rate of the transport stream S25 inputted via the interface 20 by frequency-dividing the system clock S29. Then, the digital-broadcast receiver-decoder 2 operates in accordance with the byte clock S30 generated by frequency-dividing the system clock S29 and synchronously transfers TS packets composing the transport stream S25.

According to the above configuration, it is possible to prevent transfer fault of some TS packets by generating the byte clock S11 synchronous with the transport stream S10 in the front end 10, using the frequency divider 30 for frequency-dividing the system clock S29 to generate the byte clock S30 and the clock selector 31 for selecting and supplying the byte clocks S11 and S30, and selecting the byte clock S11 when receiving and decoding broadcast radio waves or selecting the byte clock S30 when decoding a transport stream inputted from an external device. Besides, the clock generator 29 is an essential component in the case of digital data interface being provided. According to the present invention, the system clock 29 generated by the clock generator 29 is frequency-divided so as to generate a byte clock. This only requires the frequency-divider 30 and the clock selector 31 for additional circuits, and minimizes the necessity for extra circuits.

In the above embodiment, the byte clock S30 is generated by frequency-dividing the system clock S29 serving as the operation criterion of the whole interface 20. However, the present invention is not restricted to the above case. It is also permitted to generate the byte clock S30 by frequency-dividing various clocks of the digital-broadcast receiver-decoder 2.

Moreover, in the above embodiment, a clock of 6.25 MHz is generated by frequency-dividing the system clock S29 by 8 and uses the clock as the byte clock S30. However, the present invention is not restricted to the above case. It is also permitted to frequency-divide clocks having various frequencies in accordance with the assumed byte clock externally-inputted.

As described above, according to the present invention, a digital interface is provided in a digital-broadcast receiver-decoder, and a byte clock generated in accordance with digital broadcast is used when the digital broadcast is received and decoded, and a byte clock which is generated by frequency-dividing an existing system clock is used when a transport stream supplied from the digital interface is inputted and decoded. Therefore, it is possible to prevent transfer fault of some data with a simple configuration.

While there has been described in connection with the preferred embodiments of the invention, it will be obvious to those skilled in the art that various changes and modifications may be aimed, therefore to cover in the appended claims all such changes and modifications as fall within the true spirit and scope of the invention.

What is claimed is:

1. A receiver for receiving digital broadcasts, comprising:
   a tuner for receiving digital broadcast signals at a selected frequency;
   a demodulator for demodulating said received digital broadcast signals and for generating a first clock signal for transferring a first transport stream;
   an error corrector for correcting errors in said demodulated digital broadcast signals to provide said first transport stream;
   a digital interface for receiving a second transport stream supplied from an external device; and
   a decoding processor for decoding said first and second transport streams, wherein said decoding processor changes clock signals for transferring a transport stream depending on which of said first and second transport streams is being decoded such that said first clock signal is used when said first transport stream is being decoded.

2. The receiver according to claim 1, wherein said digital interface generates a second clock signal; and said decoding processor changes clock signals to a third clock signal obtained by frequency-dividing said second clock signal when said second transport stream is being decoded.

3. The receiver according to claim 2, wherein said third clock signal is generated by frequency-dividing said second clock signal such that said third clock signal transfers said second transport stream at a rate faster than a maximum transfer rate of said digital interface.

4. A receiving-decoding method for receiving digital broadcasts, comprising:
   selecting a frequency for receiving a digital broadcast;

demodulating said received digital broadcast to provide a demodulated digital broadcast and to provide a first clock signal for transferring a first transport stream;

error-correcting said demodulated digital broadcast to provide said first transport stream;

receiving a second transport stream from an external device via a digital interface;

transferring to a decoding processor said first transport stream or said second transport stream for decoding said first transport stream or said second transport stream; and changing clock signals used for transferring said first transport stream or said second transport stream depending on which of said first and second transport streams is being decoded such that said first clock signal is used when said first transport stream is being decoded.

5. The receiving-decoding method according to claim 4, further comprising:

generating a second clock signal in said digital interface; and generating a third clock signal by frequency-dividing said second clock signal;

wherein said changing step changes to said third clock signal when said second transport stream is being decoded.

6. The receiving-decoding method according to claim 5, wherein the step of generating said third clock signal frequency-divides said second clock signal such that said third clock signal transfers said second transport stream at a rate faster than a maximum transfer rate of said digital interface.

7. A receiver for receiving digital signals, comprising:

a tuner for selecting a frequency for receiving a digital signal;

a demodulator for demodulating said received digital signal and for generating a first clock signal;

an error corrector for correcting errors in said demodulated digital signal and for providing a first transport stream;

a digital interface for providing said first transport stream to an external device and for receiving a second transport stream from said external device;

a decoder for decoding one of said first and second transport streams;

a clock generator for generating a second clock signal; and a clock selector for selecting said first clock signal for transferring said first transport stream from said error corrector to said decoder and for selecting said second clock signal for transferring said second transport stream from said digital interface to said decoder.

8. The receiver according to claim 7, wherein said digital interface generates a third clock signal and said clock generator generates said second clock signal by frequency-dividing said third clock signal.

9. The receiver according to claim 8, wherein said second clock signal is generated by frequency-dividing said third clock signal such that said second transport stream is transferred at a rate faster than a maximum transfer rate of said digital interface.

10. A digital signal receiving method, comprising:

selecting a frequency for receiving a digital signal;

demodulating said received digital signal;

generating a first clock signal in association with said demodulation;

correcting errors in said demodulated digital signal to produce a first transport stream;

providing said first transport stream to an external device via a digital interface;

receiving a second transport stream from said external device via said digital interface;

transferring one of said first and second transport streams to a decoder in accordance with a byte transfer clock signal;

decoding said one of said first and second transport streams at said decoder;

generating a second clock signal; and selecting said first clock signal as said byte transfer clock signal when transferring said first transport stream and said second clock signal as said byte transfer clock signal when transferring said second transport stream.

11. The digital receiving method according to claim 10, further comprising generating a third clock signal in said digital interface, and wherein the step of generating said second clock signal includes frequency-dividing said third clock signal to provide said second clock signal.

12. The digital receiving method according to claim 11, wherein the frequency dividing step provides said second clock signal such that said second transport stream is transferred at a rate faster than a maximum transfer rate of said digital interface.

* * * * *

UNITED STATES PATENT AND TRADEMARK OFFICE
CERTIFICATE OF CORRECTION

PATENT NO.    : 6,603,816 B1
DATED         : August 5, 2003
INVENTOR(S)   : Ichiro Hamada, Kenichi Suzuki and Toshio Kato It is certified that error appears in the above-identified patent and that said Letters Patent is hereby corrected as shown below:

<u>Title page,</u>
Item [74], *Attorney, Agent or Firm*—"Lettenberg" should read -- Littenberg --.

Signed and Sealed this

Twenty-eighth Day of October, 2003

JAMES E. ROGAN
*Director of the United States Patent and Trademark Office*